United States Patent
Stephenson, III

(10) Patent No.: US 7,327,119 B2
(45) Date of Patent: Feb. 5, 2008

(54) METHOD OF EXTENDING BATTERY LIFE

(75) Inventor: Stanley W. Stephenson, III, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 401 days.

(21) Appl. No.: 11/006,927

(22) Filed: Dec. 8, 2004

(65) Prior Publication Data

US 2006/0119314 A1    Jun. 8, 2006

(51) Int. Cl.
*H01M 10/46* (2006.01)

(52) U.S. Cl. .................... 320/103; 320/166

(58) Field of Classification Search ............. 320/103, 320/110, 112, 114, 115, 166, 167
See application file for complete search history.

(56) References Cited

U.S. PATENT DOCUMENTS

| 5,686,813 | A | * | 11/1997 | Huen et al. ............... 307/150 |
| 7,015,674 | B2 | * | 3/2006 | VonderHaar ............... 320/103 |
| 2003/0001813 | A1 | | 1/2003 | Sekiguchi |
| 2003/0052645 | A1 | | 3/2003 | Sasaki |
| 2003/0135772 | A1 | | 7/2003 | Haulk |
| 2003/0164644 | A1 | | 9/2003 | Sasaki |

FOREIGN PATENT DOCUMENTS

WO    2004/086586    10/2004

* cited by examiner

*Primary Examiner*—Edward H Tso
(74) *Attorney, Agent, or Firm*—Kathleen Nenner Manne; Lynne M. Blank

(57) ABSTRACT

A method and system for conserving power and extending battery life in a device are provided wherein the method and system include the use of a save circuit to transfer unused energy from a capacitor back into a battery in the device.

13 Claims, 3 Drawing Sheets

METHOD OF EXTENDING BATTERY LIFE

FIELD OF THE INVENTION

The present invention relates to methods of improving the life of battery powered devices requiring a capacitor by draining extra power from the capacitor back into the battery.

BACKGROUND OF THE INVENTION

Many devices in use today require a high voltage for a short period of time. To accomplish this, such devices have a capacitor, the function of which is to store energy from a battery or other power source and to deliver the energy at a higher voltage than the battery supplies as needed by the device. The nature of a capacitor is that it constantly loses energy, so that once a charge is built up in the capacitor, the charge is either discharged to the device if needed at that time, or dissipated, wasting the energy without applying it to the device, and shortening the life of the battery by providing a constant drain on battery power.

Many handheld or battery-operated devices function in this manner. For example, a camera flash, a cell phone, a pager, monitors, television sets, bistable displays, and signage can all require short bursts of high voltage during operation, which voltage is supplied by a capacitor.

For example, bistable displays, and other media with memory capability, such as electrophoretic systems, can require voltages higher than are used in continuously driven display systems. Infrequently updated memory displays are useful in display systems which use batteries, such as electronic shelf labels, which can be updated a few times each week, or less frequently. Memory displays can be written by semiconductor switching elements, such as CMOS drivers, which selectively apply and remove voltage to electrodes on the display media. The drive elements for the display can require a power source having a constant voltage during the writing process. To enable the writing process, a charging circuit can generate high voltages in a storage capacitor from the battery to maintain a near-constant voltage to the display drivers during writing. The energy stored in the capacitor must be sufficient to provide the power required during the writing process without a significant decrease in voltage on the capacitor. For example, where the capacitor voltage cannot drop more than 5 percent below the required drive voltage, 20 times the drive power can be stored on the drive capacitor. After the writing process, the power can be stored at the high drive voltage on the capacitor. The internal impedance of the capacitor can cause the stored power to be dissipated over time if the writing cycles are infrequent. The majority, typically over 90 percent, of the high voltage power can be wasted in each write cycle by energy dissipation.

US Patent Application 2003/0001813 to Sekiguchi discloses the need for power saving methods in portable equipment, in particular displays. Sekiguchi saves power by modifying the waveforms that apply an electrical field to ferroelectric liquid crystals. Sekiguchi discloses lengthening the selection period during which a voltage is applied to the display to enable driving the display at lower voltages, thereby saving power. Sekiguchi uses a variety of voltages having positive and negative polarity supplied by undisclosed power sources.

US Patent Application Publication US 2003/0135772 A1 to Haulk et al. discloses a method and apparatus to conserve battery power in an Electronic Shelf Label (ESL) system. ESLs listen for transmitted data and update pricing information on an electronic display based on the transmitted data. The data receiving process requires significant energy if the system continuously receives transmissions of data. Haulk et al. reduces power consumption by turning off the reception means for a set period of time. Haulk et al. uses conventional electronic displays requiring continuous low-voltage for display.

In battery powered devices having functions requiring high voltage over brief time periods at indeterminate intervals or lengthy regular intervals, a significant multiple of the energy required for the function can be stored at high voltage on a capacitor, from which the energy is either used or dissipated, the latter more frequently being the case if long intervals occur between functions requiring the stored energy. The constant power drain from the battery to the capacitor, and subsequent loss of the energy from the capacitor by dissipation, shortens the battery life. It would be useful to recover the energy stored on the capacitor after each function, thereby increasing battery life.

SUMMARY OF THE INVENTION

A method of saving power in a system comprising a battery, a capacitor, a powered unit drawing power periodically from the battery through the capacitor, and a save circuit is provided, wherein the method comprises providing energy from the capacitor through the save circuit to the battery when the powered unit is not drawing energy from the capacitor.

ADVANTAGE OF THE INVENTION

The invention has the advantage of improving the power utilization of the battery by converting excess power in the capacitor back into useable energy stored in the battery, thereby increasing battery life.

DETAILED DESCRIPTION OF THE INVENTION

A method for saving energy in a battery-powered system including a capacitor is described, wherein excess energy in the capacitor is rerouted back to the battery, thereby extending battery life. The method and system include use of a save circuit between the capacitor and the battery, wherein energy from the capacitor is stepped down to a voltage and/or amperage compatible with the battery, and then transferred to the battery for storage and further use.

The method can be used in any battery powered electronic device that relies on a capacitor to provide short bursts of higher voltage or amperage than the battery can supply. In such a system, the capacitor is used to draw and store energy from the battery, and the energy is then supplied by the capacitor to the device in the correct amperage or voltage, or dissipated if it is unused in a certain time frame.

The save circuit can be used in any electrical device requiring short bursts of high energy at random or infrequent intervals. For example, the save circuit can be used in display devices, including bistable display devices such as liquid crystal displays; camera flashes; cell phone displays; flash lamps; signage; and other devices with occasional high power utilization, or high power utilization at lengthy intervals. The use of the save circuit is advantageous where the battery is hard to access, where the battery is inaccessible, or where a device is randomly or infrequently checked for power, because the save circuit can increase the life of the battery.

The save circuit can be between the capacitor and the battery. As used herein, "battery" can refer to a single battery, one or more batteries used in series or a parallel arrangement, or any other modular power source, and "capacitor" can refer to one or more capacitors in series or parallel. The save circuit can drain energy from the capacitor back to the battery. To recharge the battery with the energy from the capacitor, the battery can be provided energy at a given current. The save circuit can be designed to control the current between the capacitor and the battery to match the requirements of the battery, using a save current rate equal to the current rate required by the battery.

After a capacitor is charged, or charged and used to power a device, excess power can be removed from the capacitor at the save current rate. Because the power from the capacitor can be stored at a lower voltage in the battery using the save circuit, energy normally lost by discharge of the capacitor is saved.

Figure 1:
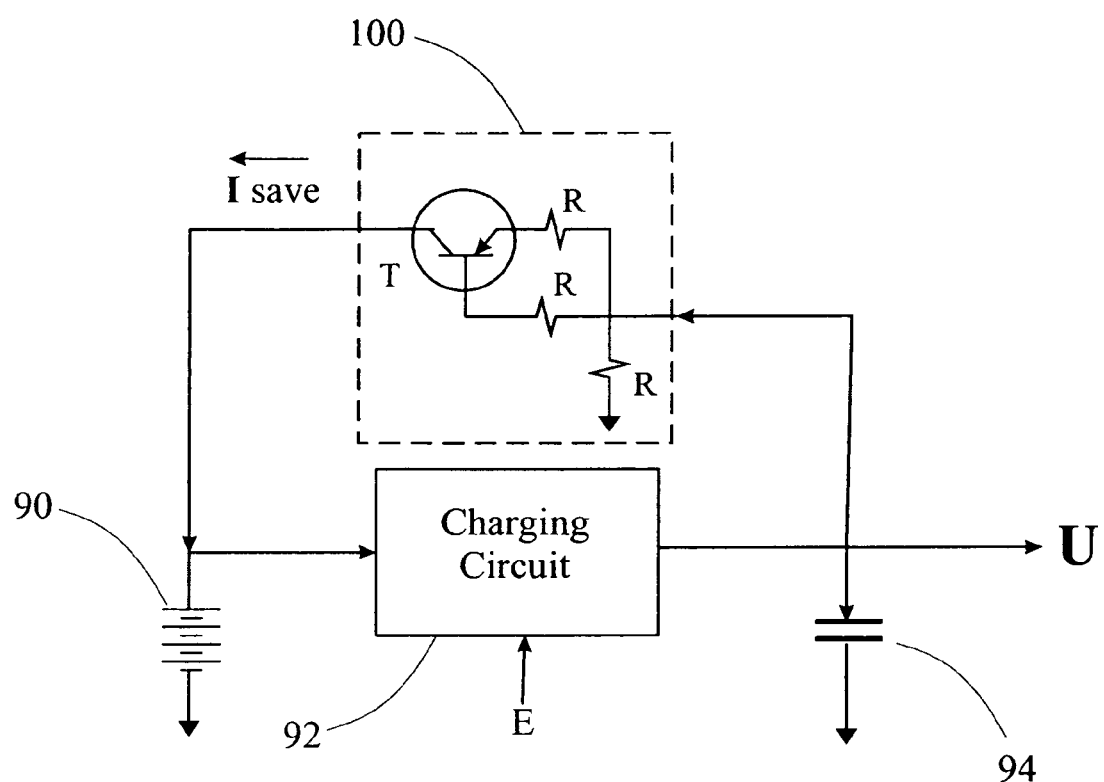
FIG. 1 is a schematic of a save circuit.

FIG. 1 is a detailed schematic of exemplary components that can be used to form a save circuit 100. Save circuits can include one or more resistor, semiconductor element, transistor switching element, or a combination thereof, wherein the combination of elements is designed to efficiently produce a save current, Isave, with minimal energy loss between the capacitor and the battery. As shown in FIG. 1, in one embodiment, save circuit 100 can include a transistor element T and a set of resistor elements R that are selected to provide save current Isave that is compatible with the charge receiving capability of battery 90. Other save circuits can be designed to provide efficient save current Isave without loss or with minimal loss of current through resistors in the current path.

The use of the save circuit in a device can reduce the amount of energy lost per charging event by channeling excess energy from the capacitor back into the battery. Adding unused energy back to the battery increases battery life, prolonging the life of the device, time of operation between battery replacements, or both.

The save circuit can be integrated into other electrical components in a device. For example, the save circuit can exist on a single, high voltage silicon chip, for example, a microprocessor or display driver. It can be advantageous to place all control components, for example, a save circuit, display driver, and processor, on a single, integrated, semiconductor chip.

Figure 2:
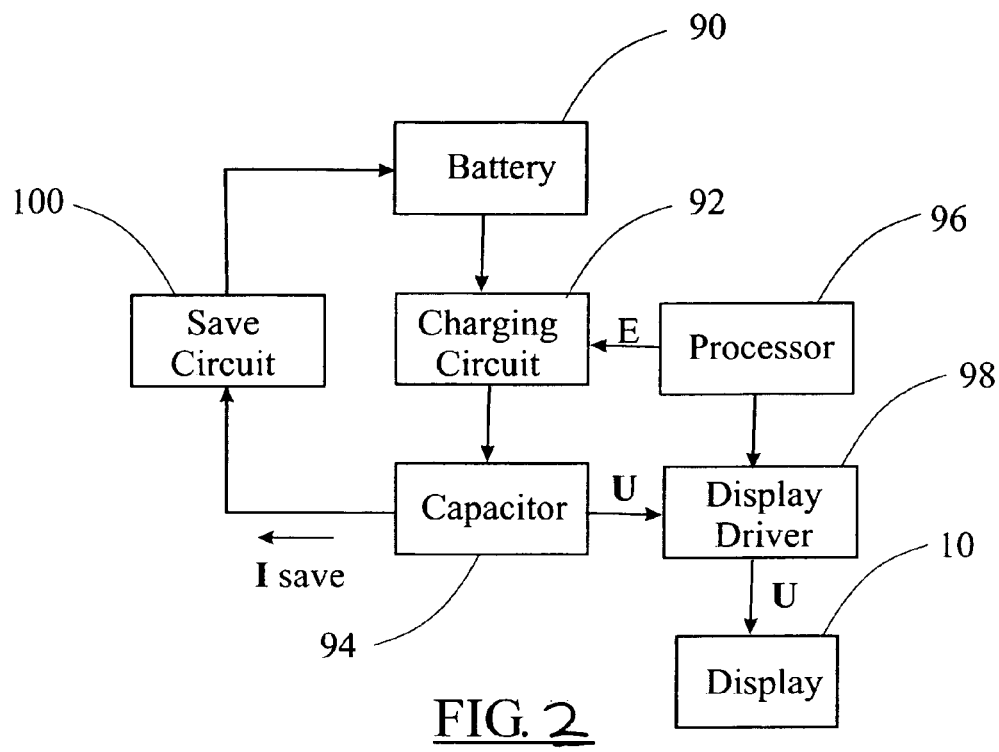
FIG. 2 is a block diagram of a drive circuit used to drive a display.

As an example of a save circuit, FIG. 2 is a block diagram of an exemplary drive circuit that can be used to drive a display device 10. A battery 90 can provide energy to a charging circuit 92. Charging circuit 92 can create a supply of energy on capacitor 94 at a voltage higher than the battery voltage. A processor 96 can selectively enable charging circuit 92 using signal E when there is a need to write display 10. After charging circuit 92 has created an appropriate voltage on capacitor 94, processor 96 can supply a signal to display driver 98 to apply voltage from capacitor 94 to display 10. Once the voltage has been applied to display 10, excess voltage can still exist on capacitor 94. The excess voltage can be drawn off the capacitor 94 through save circuit 100, where it can be stepped down to a current or voltage that can be introduced into battery 90 for saving.

Various displays can be used with the save circuit. For example, battery powered displays can be used with the circuit to conserve power and lengthen battery life. Such battery powered displays can include one or more electrically imageable material. The electrically imageable material can be light emitting or light modulating. Light emitting materials can be inorganic or organic in nature. Exemplary light emitting materials can include organic light emitting diodes (OLED) and polymeric light emitting diodes (PLED). The light modulating material can be reflective or transmissive. Light modulating materials can include electrochemical materials, electrophoretic materials such as Gyricon particles, electrochromic materials, or liquid crystal materials. The liquid crystal material can include twisted nematic (TN), super-twisted nematic (STN), ferroelectric, magnetic, or chiral nematic liquid crystals. According to certain embodiments, the material can include chiral nematic liquid crystals. The chiral nematic liquid crystals can be polymer dispersed liquid crystals (PDLC).

According to certain embodiments, the electrically imageable material can be addressed with an electric field and retain its image after the electric field is removed, a property referred to as "bistability." Particularly suitable electrically imageable materials that exhibit bistability are electrochemical materials; electrophoretic materials such as Gyricon particles; electrochromic materials; magnetic materials; or nematic or chiral nematic liquid crystal materials. According to certain embodiments, the bistable material can include chiral nematic liquid crystals. The chiral nematic liquid crystals can be polymer dispersed liquid crystals (PDLC). Suitable chiral nematic liquid crystal materials can include a cholesteric liquid crystal disclosed in U.S. Pat. No. 5,695,682, and Merck BL112, BL118 or BL126, available from EM Industries of Hawthorne, N.Y.

Figure 3:
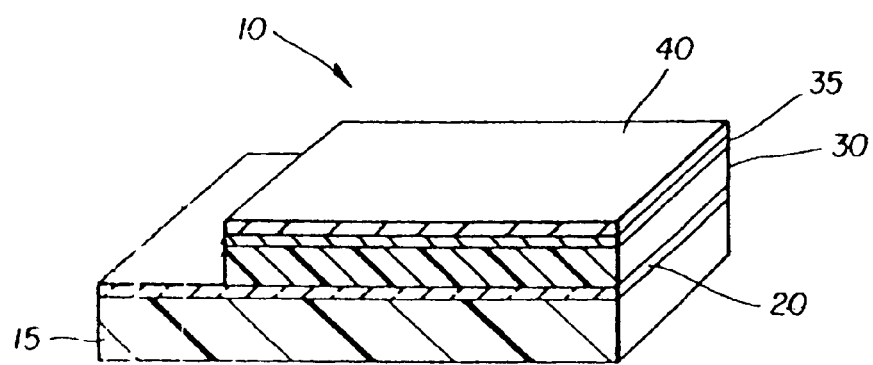
FIG. 3 is a perspective view of a display.

Displays suitable for use with the save circuit can be formed by methods known in that art of display making. Wherein the display 10 includes a bistable material, for example, a chiral nematic liquid crystal, a support 15 having a first patterned conductive layer 20 can be coated with the bistable material 30, or a pre-formed layer of the bistable material 30 can be placed over the first conductive layer 20, as shown in FIG. 3. A second conductive layer 40 can be formed over the bistable material 30 to provide for application of electric fields of various intensity and duration to the bistable material 30 to change its state from a reflective state to a transmissive state, or vice versa. The second conductive layer 40 can be patterned non-parallel to the patterning of the first conductive layer 20. The intersection of the first conductive layer 20 and the second conductive layer 40 can form a pixel. The bistable material 30 in the pixel can change state when an electric field is applied between the first and second conductive layers 20, 40. The second conductive layer 40 can be electrically conductive character segments formed over the bistable material layer 30 by thick film printing, sputter coating, or other printing or coating means. The conductive character segments can be any known aqueous conductive material, for example, carbon, graphite, or silver, for example, Electrodag 423SS screen printable electrical conductive material from Acheson Corporation. The conductive character segments can be arranged to form numbers 0-9, a slash, a decimal point, a dollar sign, a cent sign, or any other alpha-numeric character or symbol. A dark layer 35 can be between the bistable material layer 30 and the second conductive layer 40 to absorb light and/or provide a background color when the bistable material is in a certain state, providing contrast between the states of the bistable material layer 30. The bistable materials can maintain a given state indefinitely after the electric field is removed.

Displays and other devices can be electronically driven with a drive scheme. The drive scheme and voltages used in the drive scheme to power any given device will depend on the particular device, the power requirements of the device, and the power source available. For example, bistable chiral nematic displays can be powered with a battery, and driven using any of several known drive schemes, including but not limited to $U/\sqrt{2}$ dynamic driving schemes (Rybalochka et al., "Simple Drive Scheme for Bistable Cholesteric LCDs," SID 2001, pp. 882-885, and "Dynamic Drive Scheme for Fast Addressing of Cholesteric Displays," SID 2000, pp. 818-821); drive schemes utilizing variable frequency pulses as disclosed in U.S. Patent Application Publication No. US 2002/0109661 A1; dynamic drive schemes using multiple voltages to supply a pulse to the liquid crystal between the transient planar state and the stable planar state to drive the display to the focal conic state, disclosed in U.S. Patent Application Publication No. US 2003/0085863 A1; and single voltage dynamic drive schemes, as disclosed by A. Rybalochka et al., "Simple Drive Scheme for Bistable Cholesteric LCDS," The SID 2001 International Symposium Digest of Technical Papers, Paper-85, and by Johnson in U.S. patent application Ser. No. 10/845,704.

Figure 4:
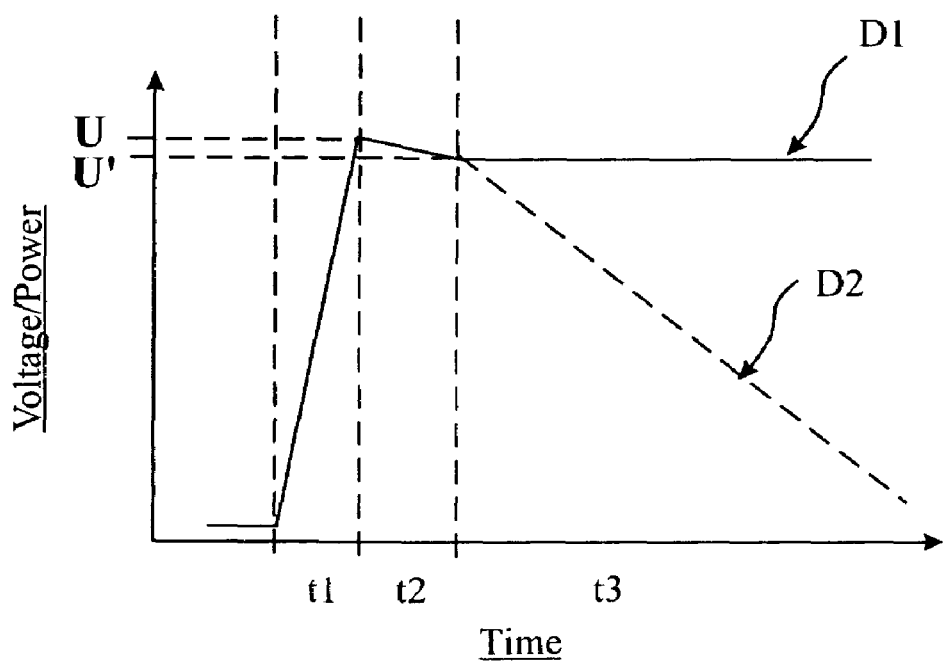
FIG. 4 is a timing diagram of the voltage across a capacitor during a write cycle.

FIG. 4 is a timing diagram of the voltage drawn across capacitor 94 in FIG. 2 during a write cycle of the display 10 using a single voltage dynamic drive scheme, wherein a single voltage U is supplied to both row and column drivers of the display to create images, and all drivers are switched between the application of U, and an electrical ground state which is effectively zero volts. During time t1, charging circuit 92 pumps energy into capacitor 94 to create high voltage U. During time t2, processor 96 writes an image to display 10. Enough energy is stored in capacitor 94 so that the voltage U does not drop below a predetermined level U' during the write cycle time t2. In a conventional drive circuit, charging circuit 92 would then be disabled using signal E, and the power remaining in capacitor 94 would decay from U' to zero over time t3 as indicated by curve D1. The power stored in capacitor 94 can be expressed as ½ $CV^2$, where C is current and V is voltage. In applications with long time durations between write cycles, the voltage from the capacitor can decay to zero, and all the energy in capacitor 94 can be lost. The internal resistance of capacitor 94 can drain the energy fastest at the high voltage that contains most of the energy. For example, where the voltage decays to half of U, 75 percent of the energy can be lost.

Using save circuit 100 as shown in FIG. 2, when processor 96 can disable charging circuit 92 using enable line E, the save circuit 100 can drain the energy from capacitor 94 back to battery 90, thereby saving most of the energy still in capacitor 94. After the display write sequence, power can be removed from capacitor 94 at the save current rate, and the voltage across battery 90 can follow curve D2 in FIG. 4, which represents energy being removed rapidly from capacitor 94 (in contrast to the slowness of natural discharge shown by D1), and being transferred for storage in battery 90. Because power can be stored in the battery 90 at a lower voltage than in the capacitor 94, at least a portion of the energy normally lost by capacitor 94 can be saved.

The save circuit can be triggered by different events. For example, a device can be programmed to run the save circuit after a discharge of the capacitor to run the intended device, after a set period of time, or continuously. Depending on the save current rate, the save circuit can be run continuously because the save current rate can be so low as to not interfere with the storage and release of power from the capacitor to the device when needed. The capacitor can also be directed to draw power from the battery on call, at regular intervals, or continuously. The time required by circuit Isave to return a certain amount of power from the capacitor to the battery can be much less than the amount of time required to charge and discharge the capacitor.

The usefulness of a save circuit in a given system can depend on the power source voltage, capacitance of a capacitor, and efficiency of the save circuit in the system. Even if the difference in voltage between the power source and capacitor is small, for example, less than 1 volt, the power saved through a save circuit can be sufficient to operate the same or other functions of the device, thereby extending device life; increase battery life by at least a desired amount, for example, at least 10%, 25%, 50%, 75% or more; or both. The save circuit can be most effective in devices having a need for a high voltage relative to a given power source over a short time. For example, the save circuit can be used where the time during which the capacitor must supply power is less than 1 second, for example, less than 0.5 second. The save circuit can preserve 30% of the power otherwise lost from a capacitor, for example, at least 50%, at least 70%, or at least 80% of the power otherwise lost.

Preferably, the time required to save energy from the capacitor to the battery is less than the time between charge and discharge of the capacitor. However, because most energy is recovered from the capacitor during the first portion of the save circuit run time, the use of the save circuit between short intervals of capacitor charge and discharge can be useful to regain large amounts of energy, even if the save circuit can not complete transfer of power from the capacitor to the power source during the given interval.

As described herein, use of a save circuit can increase battery and device life, and reduce loss of power. Such circuits are useful in any electronic devices wherein voltage or amperage is stepped up between a battery and a power-driven device by a capacitor in order to preserve energy otherwise lost by discharge of the capacitor over time.

The invention has been described in detail with particular reference to certain preferred embodiments thereof, but it will be understood that variations and modifications can be effected within the spirit and scope of the invention.

PARTS LIST 10 display
15 display substrate
20 first transparent conductors
30 cholesteric layer
35 dark layer
40 second conductors
90 battery
92 charging circuit
94 capacitor
96 processor
98 display driver
100 save circuit
U high voltage
U' minimum voltage
I save saved power current
T transistor
R resistor

The invention claimed is:

1. A method of saving power in a battery-powered system comprising a battery, a capacitor charged by the battery, a powered unit drawing power periodically from the battery through the capacitor, and a save circuit, wherein the method comprises providing excess energy from the capacitor through the save circuit back to the battery.

2. The method of claim 1, wherein the system comprises a display device, a camera display, phone display, camera flash unit, or flash lamp.

3. The method of claim 2, wherein the system comprises a display device having a bistable liquid crystal display.

4. The method of claim 1, wherein the energy provided from the capacitor to the battery through the save circuit is at least 30% of an amount energy otherwise lost from the capacitor.

5. A method of prolonging battery life in a battery-powered system comprising a battery, a capacitor charged by the battery, a powered unit drawing power periodically from the battery through the capacitor, and a save circuit, wherein the method comprises providing excess energy from the capacitor through the save circuit back to the battery.

6. The method of claim 5, wherein the system comprises a display device, a camera display, phone display, camera flash unit, or flash lamp.

7. The method of claim 6, wherein the system comprises a display device having a bistable liquid crystal display.

8. The method of claim 5, wherein the battery life is increased by at least 10 percent.

9. The method of claim 5, wherein the battery life is increased by at least 30 percent.

10. A battery-powered device comprising a battery, a capacitor charged by the battery, a powered unit drawing power periodically from the battery through the capacitor, and a save circuit between the capacitor and the battery, wherein excess energy is provided from the capacitor back to the battery through the save circuit.

11. The device of claim 10, wherein the device is a bistable display.

12. The device of claim 10, wherein the device is a liquid crystal display device.

13. The device of claim 10, wherein the device is a camera display, phone display, camera flash unit, or flash lamp.

* * * * *